US008809412B2

(12) United States Patent
Spyrou et al.

(10) Patent No.: US 8,809,412 B2
(45) Date of Patent: *Aug. 19, 2014

(54) RADIATION-CURABLE FORMULATIONS

(75) Inventors: Emmanouil Spyrou, Schermbeck (DE); Rene Koschabek, Mannheim (DE); Burkhard Standke, Loerrach (DE)

(73) Assignee: Evonik Degussa GmbH, Essen (DE)

( * ) Notice: Subject to any disclaimer, the term of this patent is extended or adjusted under 35 U.S.C. 154(b) by 412 days.

This patent is subject to a terminal disclaimer.

(21) Appl. No.: 12/675,057

(22) PCT Filed: Jun. 4, 2008

(86) PCT No.: PCT/EP2008/056865
§ 371 (c)(1),
(2), (4) Date: Feb. 24, 2010

(87) PCT Pub. No.: WO2009/027124
PCT Pub. Date: Mar. 5, 2009

(65) Prior Publication Data
US 2011/0144226 A1  Jun. 16, 2011

(30) Foreign Application Priority Data

Aug. 25, 2007 (DE) .................. 10 2007 040 246

(51) Int. Cl.
C03C 25/36 (2006.01)
C03C 25/24 (2006.01)
C03C 25/32 (2006.01)
B32B 15/04 (2006.01)
B32B 15/08 (2006.01)

(52) U.S. Cl.
USPC ............. 522/91; 522/178; 522/148; 522/113; 522/114; 522/120; 522/121; 522/134; 522/135; 522/139; 522/142; 522/143; 522/168; 522/172; 428/411.1; 428/457; 428/461; 428/463; 427/508; 427/525; 427/517; 427/518; 427/407.1; 427/409; 427/410

(58) Field of Classification Search
USPC ......... 522/100, 103, 104, 113, 114, 122, 120, 522/121, 134, 135, 139, 142, 143, 144, 99, 522/172, 148, 84, 85, 86; 428/411.1, 457, 428/461, 463; 427/508, 525, 517, 518, 427/407.1, 409, 410
See application file for complete search history.

(56) References Cited

U.S. PATENT DOCUMENTS

| | | | |
|---|---|---|---|
| 4,026,826 A * | 5/1977 | Yoshida et al. | 528/12 |
| 4,378,250 A * | 3/1983 | Treadway et al. | 106/287.11 |
| 5,221,560 A * | 6/1993 | Perkins et al. | 427/515 |
| 5,306,856 A | 4/1994 | Streck et al. | |
| 5,591,818 A | 1/1997 | Standke et al. | |
| 5,629,358 A * | 5/1997 | Nagahata et al. | 522/84 |
| 5,744,675 A | 4/1998 | Fiolitakis et al. | |
| 5,885,341 A | 3/1999 | Standke et al. | |
| 5,907,000 A * | 5/1999 | Treadway | 522/79 |
| 5,932,757 A | 8/1999 | Standke et al. | |
| 5,959,778 A * | 9/1999 | Shimonura et al. | 359/618 |
| 6,133,466 A | 10/2000 | Edelmann et al. | |
| 6,239,194 B1 | 5/2001 | Standke et al. | |
| 6,361,871 B1 | 3/2002 | Jenkner et al. | |
| 6,395,858 B1 | 5/2002 | Mack et al. | |
| 6,403,228 B1 | 6/2002 | Mack et al. | |
| 6,500,883 B1 | 12/2002 | Mack et al. | |
| 6,528,585 B1 | 3/2003 | Standke et al. | |
| 6,641,870 B2 | 11/2003 | Bartkowiak et al. | |
| 6,663,683 B2 | 12/2003 | Lortz et al. | |
| 6,676,719 B2 | 1/2004 | Lortz et al. | |
| 6,689,468 B2 | 2/2004 | Edelmann et al. | |
| 6,695,904 B2 | 2/2004 | Burger et al. | |
| 6,699,586 B2 | 3/2004 | Edelmann et al. | |
| 6,747,070 B2 | 6/2004 | Wenning et al. | |
| 6,767,377 B2 | 7/2004 | Schumacher et al. | |
| 6,773,697 B2 | 8/2004 | Hemme et al. | |
| 6,773,814 B2 | 8/2004 | Schumacher et al. | |
| 6,808,769 B2 | 10/2004 | Batz-Sohn et al. | |
| 6,825,240 B2 | 11/2004 | Wenning et al. | |
| 6,830,816 B2 | 12/2004 | Mehnert et al. | |
| 6,841,197 B2 | 1/2005 | Standke et al. | |
| 6,855,792 B2 | 2/2005 | Speier et al. | |
| 6,861,465 B2 | 3/2005 | Wenning et al. | |
| 6,864,323 B2 | 3/2005 | Schlosser et al. | |
| 6,905,632 B2 | 6/2005 | Lortz et al. | |
| 6,924,385 B2 | 8/2005 | Lettmann et al. | |
| 6,946,537 B2 | 9/2005 | Krafczyk et al. | |
| 6,960,620 B2 | 11/2005 | Wenning et al. | |

(Continued)

FOREIGN PATENT DOCUMENTS

| | | |
|---|---|---|
| EP | 0 978 525 | 2/2000 |
| EP | 1 693 690 | 8/2006 |
| WO | WO 2009021766 A1 * | 2/2009 |

OTHER PUBLICATIONS (6-Cumene)(5-cyclopentadienyl)iron(II)hexafluorophosphate; Irgacure 261 chemical listing from ChemBlink.com. [online]. [Retrieved online on Feb. 23, 2012]. Retrieved from internet <URLhttp://www.chemblink.com/products/32760-80-8.htm>.:.*
U.S. Appl. No. 08/124,955, filed Sep. 21, 1993, Standke, et al.
U.S. Appl. No. 10/112,045, filed Apr. 1, 2002, Mehnert, et al.
U.S. Appl. No. 12/992,684, filed Mar. 4, 2011, Nowak, et al.

(Continued)

*Primary Examiner* — Sanza McClendon
(74) *Attorney, Agent, or Firm* — Oblon, Spivak, McClelland, Maier & Neustadt, L.L.P.

(57) ABSTRACT

The present invention relates to the use of oligomeric siloxane components in radiation-curable formulations which in the cured state offer a particular degree of corrosion control for metallic substrates.

15 Claims, No Drawings

(56) References Cited

U.S. PATENT DOCUMENTS

| | | | |
|---|---|---|---|
| 6,991,190 B2 | 1/2006 | Lortz et al. | |
| 7,015,270 B2 | 3/2006 | Scharfe et al. | |
| 7,026,398 B2 | 4/2006 | Monkiewicz et al. | |
| 7,083,769 B2 | 8/2006 | Moerters et al. | |
| 7,244,302 B2 | 7/2007 | Schumacher et al. | |
| 7,255,735 B2 | 8/2007 | Meyer et al. | |
| 7,374,787 B2 | 5/2008 | Lortz et al. | |
| 7,399,487 B2 | 7/2008 | Batz-Sohn et al. | |
| 7,423,165 B2 | 9/2008 | Korth et al. | |
| 7,470,423 B2 | 12/2008 | Lortz et al. | |
| 7,514,482 B2 * | 4/2009 | Treadway | 522/170 |
| 7,538,142 B2 | 5/2009 | Lortz et al. | |
| 7,572,854 B2 | 8/2009 | Schneider et al. | |
| 7,615,577 B2 | 11/2009 | Lortz et al. | |
| 7,625,975 B2 | 12/2009 | Barfurth et al. | |
| 7,645,335 B2 | 1/2010 | Lortz et al. | |
| 7,749,322 B2 | 7/2010 | Schumacher et al. | |
| 7,780,777 B2 | 8/2010 | Perlet et al. | |
| 7,781,520 B2 | 8/2010 | Standke et al. | |
| 7,815,936 B2 | 10/2010 | Hasenzahl et al. | |
| 7,834,073 B2 | 11/2010 | Standke et al. | |
| 7,976,719 B2 | 7/2011 | Batz-Sohn et al. | |
| 8,012,367 B2 | 9/2011 | Hasenzahl et al. | |
| 8,039,110 B2 | 10/2011 | Jenkner et al. | |
| 2002/0016418 A1 * | 2/2002 | Maruyama et al. | 525/326.6 |
| 2002/0098243 A1 | 7/2002 | Edelmann et al. | |
| 2002/0127415 A1 | 9/2002 | Standke et al. | |
| 2002/0197311 A1 | 12/2002 | Hasenzahl et al. | |
| 2003/0018155 A1 | 1/2003 | Krafczyk et al. | |
| 2003/0108580 A1 | 6/2003 | Hasenzahl et al. | |
| 2003/0134969 A1 | 7/2003 | Schlosser et al. | |
| 2003/0228271 A1 | 12/2003 | Batz-Sohn et al. | |
| 2004/0240062 A1 | 12/2004 | Lortz et al. | |
| 2005/0169861 A1 | 8/2005 | Lortz et al. | |
| 2005/0265934 A1 | 12/2005 | Schumacher et al. | |
| 2006/0063002 A1 | 3/2006 | Edelmann et al. | |
| 2006/0104881 A1 | 5/2006 | Lortz et al. | |
| 2006/0159635 A1 | 7/2006 | Meyer et al. | |
| 2006/0159636 A1 | 7/2006 | Meyer et al. | |
| 2006/0159637 A1 | 7/2006 | Meyer et al. | |
| 2006/0163533 A1 | 7/2006 | Batz-Sohn et al. | |
| 2006/0229210 A1 | 10/2006 | Neugebauer et al. | |
| 2006/0292192 A1 | 12/2006 | Hasenzahl et al. | |
| 2007/0099004 A1 | 5/2007 | Edelmann et al. | |
| 2007/0110906 A1 | 5/2007 | Edelmann et al. | |
| 2007/0114491 A1 | 5/2007 | Shi et al. | |
| 2007/0231280 A1 | 10/2007 | Schumacher et al. | |
| 2007/0297998 A1 | 12/2007 | Meyer et al. | |
| 2008/0027161 A1 | 1/2008 | Schlosser et al. | |
| 2008/0058489 A1 | 3/2008 | Edelmann et al. | |
| 2008/0095724 A1 | 4/2008 | Hasenzahl et al. | |
| 2008/0187673 A1 | 8/2008 | Standke et al. | |
| 2008/0200577 A1 | 8/2008 | Spyrou et al. | |
| 2008/0206572 A1 | 8/2008 | Edelmann et al. | |
| 2008/0213325 A1 | 9/2008 | Schumacher et al. | |
| 2008/0221318 A1 | 9/2008 | Edelmann et al. | |
| 2008/0249237 A1 | 10/2008 | Hager et al. | |
| 2008/0264299 A1 | 10/2008 | Lortz et al. | |
| 2009/0005518 A1 | 1/2009 | Just et al. | |
| 2009/0007818 A1 | 1/2009 | Militz et al. | |
| 2009/0022898 A1 | 1/2009 | Standke et al. | |
| 2009/0030162 A1 | 1/2009 | Mueh et al. | |
| 2009/0047225 A1 | 2/2009 | Hasenzahl et al. | |
| 2009/0069464 A1 | 3/2009 | Standke | |
| 2009/0131694 A1 | 5/2009 | Schumacher et al. | |
| 2009/0186053 A1 | 7/2009 | Meyer et al. | |
| 2009/0261309 A1 | 10/2009 | Lortz et al. | |
| 2010/0117021 A1 | 5/2010 | Batz-Sohn et al. | |
| 2010/0119851 A1 | 5/2010 | Giessler-Blank et al. | |
| 2010/0159144 A1 | 6/2010 | Standke et al. | |
| 2010/0191001 A1 * | 7/2010 | Wassmer et al. | 549/215 |
| 2010/0209339 A1 | 8/2010 | Schumacher et al. | |
| 2010/0209719 A1 | 8/2010 | Borup et al. | |
| 2010/0233392 A1 | 9/2010 | Batz-Sohn et al. | |
| 2010/0308287 A1 | 12/2010 | Lortz et al. | |
| 2011/0034584 A1 | 2/2011 | Albert et al. | |
| 2011/0045723 A1 | 2/2011 | Nowak et al. | |
| 2011/0071256 A1 | 3/2011 | Nowak et al. | |
| 2011/0143147 A1 | 6/2011 | Edelmann et al. | |
| 2011/0259240 A1 | 10/2011 | Jenkner et al. | |
| 2011/0268899 A1 | 11/2011 | Albert et al. | |

OTHER PUBLICATIONS

U.S. Appl. No. 13/058,290, filed Feb. 9, 2011, Weissenbach, et al.
U.S. Appl. No. 13/059,546, filed Feb. 17, 2011, Weissenbach, et al.
U.S. Appl. No. 13/062,225, Mar. 4, 2011, Weissenbach, et al.
U.S. Appl. No. 61/093,219, filed Aug. 29, 2008, Simoes.
U.S. Appl. No. 13/061,451, filed Feb. 28, 2011, Weissenbach, et al.
U.S. Appl. No. 13/011,115, filed Jan. 21, 2011, Ruf, et al.
U.S. Appl. No. 12/440,927, filed Mar. 12, 2009, Spyrou, et al.
U.S. Appl. No. 12/673,390, filed Feb. 12, 2010, Wassmer, et al.
U.S. Appl. No. 12/673,289, filed Feb. 12, 2010, Koschabek, et al.
U.S. Appl. No. 12/520,873, filed Jun. 23, 2009, Spyrou, et al.
U.S. Appl. No. 12/161,112, filed Jul. 16, 2008, Standke, et al.
U.S. Appl. No. 12/933,028, filed Sep. 16, 2010, Spyrou.
U.S. Appl. No. 13/257,488, filed Oct. 21, 2011, Standke, et al.
U.S. Appl. No. 13/256,557, filed Sep. 14, 2011, Scharfe, et al.

* cited by examiner

RADIATION-CURABLE FORMULATIONS

The present invention relates to the use of oligomeric siloxane components in radiation-curable formulations which in the cured state offer a particular degree of corrosion control for metallic substrates.

Radiation-curable formulations are known.

Ethylenically unsaturated prepolymers are described in, for example, P. K. T. Oldring (ed.), "Chemistry and Technology of UV and EB Formulations for Coatings, Inks and Paints", vol. II., SITA Technology, London 1991, based for example on epoxy acrylates (pages 31 to 68), urethane acrylates (pages 73 to 123) and melamine acrylates (pages 208 to 214). Formulations of this kind are frequently mentioned in the patent literature as well: examples include JP 62110779 and EP 947 565.

The coating of metallic substrates poses a particular problem for radiation-curable formulations, since processes of contraction may result in loss of adhesion. For such substrates it is therefore common to use adhesion promoters containing phosphoric acid. Examples of this are U.S. Pat. No. 5,128,387 (coating of beer cans) and JP 2001172554 (coating of various cans).

Epoxy acrylates are known to exhibit outstanding adhesion and effective corrosion control on metal substrates. A disadvantage of such coatings, however, is the low level of deformability after curing. For certain coating technologies, coil coating being one example, the deformability of the coated workpieces without the coating cracking is critical. Moreover, on account of their aromatic fractions, coatings of this kind have a tendency towards yellowing.

WO 03/022945 describes low-viscosity radiation-curable formulations for metal substrates that are based on radiation-curable resins, monofunctional reactive diluents, and acidic adhesion promoters. The resins employed are typical commercial products available from a variety of suppliers.

EP 902 040 as well relates to radiation-curable formulations. Described therein are urethane (meth)acrylates with monofunctional esters of an unsaturated carboxylic acid, which are esterified with alcohols containing a carbocyclic or heterocyclic ring.

The systems known from the prior art, however, in many cases exhibit disadvantages; more particularly, the deformability and the stability do not always meet the requirements that are imposed.

An object of the present invention is to find radiation-curable formulations which on the one hand are readily deformable, i.e. flexible, after coating, but on the other hand also ensure outstanding corrosion control for metal substrates.

Surprisingly it has been found that the corrosion resistance of coating materials based on radiation-curable formulations on metallic substrates increases if oligomeric siloxane components are included in the formulation. Radiation-curable formulations for the purposes of the present invention are formulations which can be cured by IR or UV radiation, electron beams, microwave radiation, laser beams or plasma.

Accordingly the present invention first provides for the use of oligomeric siloxane components in radiation-curable formulations, more particularly coating materials. Particularly suitable are hydrolysed and condensed organosilanes which are obtainable by controlled hydrolysis and condensation of at least one epoxy-functional silane of the general formula I

      (I), in which $R^1$ is a group

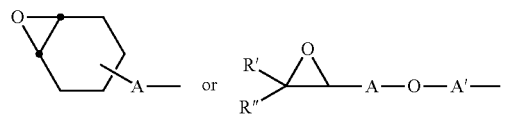

and the groups R, R' and R" are alike or different and in each case are a hydrogen (H) or are a linear, branched or cyclic, unsubstituted or substituted alkyl group having 1 to 6 C atoms, preferably H, methyl, ethyl, n-propyl, n-butyl, groups A and A' are alike or different and in each case are a divalent alkyl group having 1 to 10 C atoms, preferably —(CH$_2$)$_2$—, —(CH$_2$)$_2$—, —(CH$_2$)$_3$—, —(CH$_2$)(CH)(CH$_3$)(CH$_2$)— for A' and also —(CH$_2$)— for A, and m is 0 or 1, in the presence of boric acid [H$_3$BO$_3$ or B(OH)$_3$].

Likewise provided by the present invention are radiation-curable formulations comprising at least one radiation-curable resin and at least 2% by weight of at least one oligomeric siloxane component, based on the total formulation. A preferred radiation-curable formulation in accordance with the present invention is more particularly the formulation composed of A) at least one radiation-curable resin,
B) at least 2% by weight of at least one oligomeric siloxane component, based on the total formulation,
C) optionally one or more adhesion promoters,
D) optionally one or more radiation-curable reactive diluents,
E) optionally one or more photoinitiators,
F) optionally one or more pigments and other adjuvants.

The radiation-curable formulations of the invention have the advantage that, on application, improved flexibility and effective corrosion control are achieved.

One important constituent of the formulations of the invention are the radiation-curable resins A). These are systems that are known to a person skilled in the art. The preparation of radiation-curable resins, oligomers and/or polymers, is described in, for example, "Radiation Curing in Polymer Science & Technology, Vol. I: Fundamentals and Methods" by J. P. Fouassier, J. F. Rabek, Elsevier Applied Science, London and New York, 1993, chapter 5, pages 226 to 236, in "Lackharze" [Resins for Coatings], D. Stoye, W. Freitag, Hanser-Verlag, Vienna, 1996, pages 85, 94-98, 169 and 265, and in EP 947 565.

For the resins A) a distinction according to raw materials basis is made between, for example, epoxy acrylates, polyester acrylates, polyether acrylates, polyacrylate acrylates, and urethane acrylates, alone or in a mixture. The latter may be based, for example, on polyesters or else on polyethers. The corresponding methacrylates are known as well. Other polymerizable groups are epoxides and vinyl ethers. These too may be attached to different base resins.

The amount of A) in the formulation varies from 5% to 95% by weight, preferably 10% to 39% by weight. Particular preference is given to polyesterurethane acrylates. Examples thereof are VESTICOAT EP 110 IBOA (commercial product of Degussa GmbH, Germany, Coatings & Colorants, difunctional polyesterurethane acrylate) and EBECRYL 1256 (commercial product of Cytec).

A further important constituent of the formulations of the invention are the oligomeric siloxane components B). The fraction of oligomeric siloxane components B) as a proportion of the total formulation is more particularly 2% to 25% by weight, preferably 5% to 15% by weight. One process, which is general knowledge, for the preparation of hydrolysed organosilanes B) of this kind is the sol-gel process, as described comprehensively by C. J. Brinker and G. W. Scherer in *Sol-Gel Science: The Physics and Chemistry of Sol-Gel Processing*, Academic Press, New York (1990).

More particularly preferred are the oligomeric siloxane components obtainable by controlled hydrolysis and condensation of at least one epoxy-functional silane of the general formula I

in which $R^1$ is a group

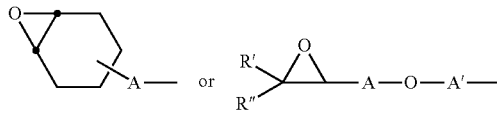

and the groups R, R' and R'' are alike or different and in each case are a hydrogen (H) or are a linear, branched or cyclic, unsubstituted or substituted alkyl group having 1 to 6 C atoms, preferably H, methyl, ethyl, n-propyl, n-butyl, groups A and A' are alike or different and in each case are a divalent alkyl group having 1 to 10 C atoms, preferably —(CH$_2$)$_2$—, —(CH$_2$)$_2$—, —(CH$_2$)$_3$—, —(CH$_2$)(CH)(CH$_3$)(CH$_2$)— for A' and also —(CH$_2$)— for A, and m is 0 or 1, in the presence of boric acid.

Typically the preparation of sol-gel systems uses the water usually in an excess. The objective here is to maximise the degree of hydrolysis. Many silanes, unfortunately, do not undergo full hydrolysis under these conditions. For example, in the hydrolysis of the 3-glycidyloxypropyltrimethoxysilane, there remains a monomer fraction of approximately 90% (area percent GC TCD) even with a high concentration of acidic catalysts, such as HCl or acetic acid, even after hours, and even after hydrolysis at elevated temperature.

For this purpose, in a parallel application, a new method has been provided that allows epoxy-functional silanes, more particularly 3-glycidyloxypropylalkoxy-silanes per se or corresponding mixtures of organoalkoxysilanes containing 3-glycidyloxypropyl-alkoxysilane, to be hydrolysed, and at least proportionally condensed, with a substoichiometric amount of water, reliably and to a very high degree, using boric acid.

During the curing of the coating, the siloxane oligomer that is used co-crosslinks with, for example, an organic polyesterurethane acrylate and is able through further functional groups to make a contribution to improved substrate adhesion.

During the hydrolysis and condensation it is additionally possible to have at least one further organofunctional silane present, of the general formula II

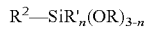

in which $R^2$ is a linear, branched or cyclic, unsubstituted or substituted alkyl group having 1 to 20 C atoms, substituted for example by N—, O—, S— or halogen-bearing groups, such as fluoroalkyl, amino-alkyl, mercaptoalkyl, methacryloyloxyalkyl or OR, i.e. OH or alkoxy, more particularly methoxy or ethoxy, R' is methyl, groups R independently are a hydrogen or are a linear, branched or cyclic alkyl group having 1 to 6 C atoms, and n is 0 or 1. In accordance with formula II it is possible with advantage in the process of the invention to use methoxysilanes or ethoxysilanes which carry more particularly a functional group $R^2$ from the series, methoxy, ethoxy, methyl, ethyl, n-propyl, isopropyl, n-butyl, n-octyl, isooctyl, tridecafluoro-1,1,2,2-tetrahydrooctyl, to name but a few examples—by way of example, but not exclusively, methyltrimethoxysilane, methyltriethoxysilane, vinyl-trimethoxysilane, vinyltriethoxysilane, n-propyl-trimethoxysilane, n-propyltriethoxysilane, n-octyl-trimethoxysilane, n-octyltriethoxysilane, hexadecyl-trimethoxysilane, hexadecyltriethoxysilane, tridecafluoro-1,1,2,2-tetrahydrooctyltrimethoxysilane, tridecafluoro-1,1,2,2-tetrahydrooctyltriethoxysilane, methacryloyloxypropyltrimethoxysilane, methacryloyloxy-propyltriethoxysilane, mercaptopropyltrimethoxysilane, mercaptopropyltriethoxysilane, tetramethoxysilane, tetraethoxysilane.

In the preparation of the siloxane component 0.001 to ≤5 mol of water is used per mole of alkoxy function in the silanes used; besides boric acid as a hydrolysis catalyst and the condensation component, no further hydrolysis catalyst or condensation catalyst is used and the condensates formed in the reaction are based on Si—O—B and/or Si—O—Si bonds.

In the reaction, per mole of alkoxy function of formula I and/or II that is used, it is preferred to use 0.05 to 5 mol, more preferably 0.1 to 2 mol, very preferably 0.15 to 1 mol, more particularly all numerical values in-between, between 0.15 to 1 mol—for example, but not exclusively, 0.2, 0.3, 0.4, 0.5, 0.6, 0.7, 0.8, 0.9 mol of water.

Preference is further given in the process, per mole of silane that is used, to 0.001 to 1 mol of boron, more preferably 0.01 to 0.5 mol, more particularly 0.07 to 0.76 mol of boron, which is introduced advantageously in the form of boric acid [$H_3BO_2$ or $B(OH)_3$].

In the process, moreover, the reaction is carried out advantageously at a temperature in the range from 0 to 200° C., preferably at 40 to 150° C., more preferably from 50 to 100° C., very preferably 60 to 80° C.

Hence the reaction is carried out, more particularly with thorough mixing, over 0.1 to 100 h, preferably 0.5 to 20 h, more preferably 1 to 10 h, very preferably over 2 to 6 h.

It is likewise possible and advantageous, in the case of the stated process, to remove at least a proportion of the alcohol and/or boric ester present from the resulting product mixture, in a conventional distillation under reduced pressure. Alternatively such constituents can be removed from the product by means of short-path evaporators and/or thin-film evaporators. Furthermore, products obtained in this way can—if necessary—be filtered or centrifuged in order to separate off suspended particles. This can be done using, for example, a filter or a centrifuge.

With more particular preference the glycidylpropyl-alkoxysilane of the general formula I is glycidyloxypropyltrimethoxysilane or glycidyloxypropyltriethoxysilane.

By way of example it is possible advantageously to carry out a virtually complete hydrolysis of 3-glycidyloxypropyltrimethoxysilane (GLYMO) with an amount of water of 0.05 to 5, preferably 0.1 to 2, more particularly 0.15 to 1 mol of water per mole of alkoxy function used, with the use or in the presence of boric acid. More particularly it is possible over the course of just 7 hours to react as good as all of the GLYMO to oligomeric products by means of boric acid catalysis. A virtually complete hydrolysis in this context means that less than 20% by weight or area % (GC-TCD %) of the monomeric silane originally used remains unhydrolysed in the reaction space after the hydrolysis has been performed.

Reaction checking (determination of the concentration of monomeric silanes in the reaction mixture) is accomplished preferably by way of standard gas chromatography (HP 5890 series II, thermal conductivity detector). Temperature measurement may be accomplished conventionally via thermocouples. Pressure measurement is accomplished, for example, by means of piezoelectric pressure transducers (e.g. Vacubrand DVR 2). The residual monomer content of the products can be checked additionally via $^{29}$Si NMR spectroscopy, and is situated advantageously in the range from 5 to 17 mol %. The degree of crosslinking of the product was ascertained by determining the M, D and T structural units via $^{29}$Si NMR spectroscopy. In the silane condensates of the invention the fraction of M structural units is preferably in the range from 14 to 35 mol %, that of D structures in the range from 36 to 42 mol %, and that of T structures in the range from 15% to 34%. The hydro-methanolysis of the epoxide group can be determined via $^{13}$C NMR spectroscopy. Advantageously the product compositions of the invention contain only a fraction of 3 to 7 mol % of opened epoxide, based on the epoxide fraction originally used.

Optionally the formulations of the invention may contain adhesion promoters C). Adhesion promoters for radiation-curable formulations for metallic substrates are generally composed of phosphoric acid and/or phosphonic acid and/or reaction products thereof (e.g. esters) with functionalized acrylates. While the free phosphoric acid groups are responsible for the direct adhesion to the metal, the acrylate groups ensure a bond with the coating matrix. Products of this kind are described in, for example, WO 01/98413, JP 08231564, and JP 06313127, whose disclosure content is hereby incorporated by reference.

Typical commercial products are EBECRYL 169 and 170 from Cytec, ALDITOL Vxl 6219 from VIANOVA, CD 9050 and CD 9052 from Sartomer, SIPOMER PAM-100, SIPOMER PAM-200 and SIPOMER PAM-300 from Rhodia, and GENORAD 40 from Rahn. The amount of C) in the formulation is 0.1% to 10% by weight, preferably from 1% to 5% by weight.

The formulations of the invention may likewise include radiation-curable reactive diluents D). Radiation-curable reactive diluents D) and their preparation are described in, for example, "Radiation Curing in Polymer Science & Technology, Vol. I: Fundamentals and Methods" by J. P. Fouassier, J. F. Rabek, Elsevier Applied Science, London and New York, 1993, chapter 5, pages 237 to 240. Generally speaking these are acrylate- or methacrylate-containing compounds which are liquid at room temperature and hence are able to lower the overall viscosity of the formulation. Examples of such products are more particularly isobornyl acrylate, hydroxypropyl methacrylate, trimethylolpropane formal monoacrylate, tetrahydrofurfuryl acrylate, phenoxyethyl acrylate, trimethylolpropane triacrylate, dipropylene glycol diacrylate, tripropylene glycol diacrylate, hexanediol diacrylate, pentaerythritol tetraacrylate, lauryl acrylate, and propoxylated or ethoxylated variants of these reactive diluents, and/or urethanized reactive diluents such as EBECRYL 1039 (Cytec) and others. Also suitable are other liquid components capable of reacting under conditions of free-radical polymerization with, for example, vinyl ether or allyl ether. The amount of D) in the formulation is 5% to 90% by weight, preferably 10% to 70% by weight.

The formulations of the invention may likewise include photoinitiators E). Suitable photoinitiators and their preparation are described in, for example, "Radiation Curing in Polymer Science & Technology, Vol. II: Photoinitiating Systems" by J. P. Fouassier, J. F. Rabek, Elsevier Applied Science, London and New York, 1993. Frequently they are α-hydroxy ketones or derivatives thereof. If present, the photoinitiators can be included in amounts from 0.2% to 10% by weight.

Suitable pigments F) for radiation-curable formulations of the present invention are described in, for example, "Radiation Curing in Polymer Science & Technology, Vol. IV: Practical Aspects and Application" by J. P. Fouassier, J. F. Rabek, Elsevier Applied Science, London and New York, 1993, chapter 5, pages 87 to 105, and can be included in amounts from 1% to 40% by weight. Examples of anti-corrosion pigments are found, for example, in Pigment+Füllstoff Tabellen, O. Lückert, Vincentz Verlag Hanover, 6th edition 2002. Examples include the following: SHIELDEX C 303 (Grace Davison) and HALOX Coil X 100, HALOX Coil X 200 and HALOX CW 491 (Erbslöh), HEUCOPHOS SAPP or else ZPA (Heubach), K-White TC 720 (Tayca) and HOMBICOR (Sachtleben). Of course, simple inorganic salts such as zinc phosphate, for example, are also suitable.

Other adjuvants F) for radiation-curable formulations are available in various compositions and for diverse purposes, examples being flow control agents, matting agents, degassing agents, etc.

Some of them are described in the brochure "SELECTED DEGUSSA PRODUCTS FOR RADIATION CURING AND PRINTING INKS", published by Tego Coating & Ink Additives, Essen, 2003. The amount of such additives varies from 0.01% to 5% by weight, if present.

The present invention further provides for the use of radiation-curable formulations of the invention as a primer, intercoat, topcoat or clearcoat material and/or in coatings. More particular preference is given to the use of a radiation-curable formulation composed of
A) at least one radiation-curable resin,
B) at least 2% by weight of at least one oligomeric siloxane component, based on the total formulation,
C) optionally an adhesion promoter,
D) optionally a radiation-curable reactive diluent,
E) optionally photoinitiators,
F) optionally pigments and other adjuvants
as a primer, intercoat, topcoat and/or clearcoat material.

The radiation-curable formulation may be applied by techniques that are known within coatings technology, such as knife coating, rolling, spraying or injecting, for example.

The most suitable metallic substrate is steel, optionally pretreated, but suitability as metallic substrate is also possessed by aluminium and other metals or alloys that are given a coating on grounds of corrosion control.

Curing is accomplished in the presence of photoinitiators under UV light or in the absence of photoinitiators under electron beams. The properties of the cured coating materials are largely independent of the curing method.

UV curing and UV lamps are described in, for example, "Radiation Curing in Polymer Science & Technology, Vol. I: Fundamentals and Methods" by J. P. Fouassier, J. F. Rabek, Elsevier Applied Science, London and New York, 1993, chapter 8, pages 453 to 503.

Likewise provided by the invention is the use of a radiation-curable formulation of the invention for producing coatings by the coil coating process, it being possible for the preferential forms described above, as well, to be employed for this subject-matter of the present invention.

The present invention further provides coatings containing or based on radiation-curable formulations according to the present invention. In this context the present invention also and more particularly embraces the cured coatings containing or based on radiation-curable formulations.

The coating of the invention can be used either alone or else as one coat of a multi-coat system. It may be applied, for example, as a primer, as an intercoat or as a topcoat or clearcoat. The coats above or below the coating of the invention may be cured either conventionally, thermally, or else, alternatively, by means of radiation.

Even without further remarks it is assumed that a person skilled in the art will be able to utilize the above description to its widest extent. Consequently the preferred embodiments and examples are to be interpreted merely as a descriptive disclosure which in no way has any limiting effect whatsoever.

The present invention is elucidated below with reference to examples. Alternative embodiments of the present invention are obtainable analogously.

EXAMPLES

| Ingredients | Product description, manufacturer |
|---|---|
| VESTICOAT EP 110/ IBOA | Radiation-curable resin, Degussa GmbH, Coatings & Colorants, in solution in 25% IBOA |
| IBOA | Isobornyl acrylate, Cytec, mono-functional reactive diluent |
| IRGACURE 184 | Photoinitiator, Ciba |
| Dynasylan GLYMO | 3-Glycidyloxypropyltrimethoxysilane, Degussa GmbH |

Preparation of a Hydrolysed Organosilane (Dynasylan Glymo)

10 g of Dynasylan GLYMO are admixed with 1.14 g of water (1.5 mol/mol Si) and 0.2 g of boric acid and the mixture is stirred at 70° C. for two hours. Subsequently, at 1 mbar and 70° C., the hydrolysis alcohol produced is removed under reduced pressure. The product is a colorless oligomer which is stable on storage for at least three months.

General Preparation Instructions for the Formulation and Curing of UV Coating Materials All of the constituents of the formulation are combined and stirred for 20 minutes, using a magnetic stirrer.

The operative formulation is applied by knife coating to steel panels (Bonder panels 1303) and subsequently cured under a UV lamp (3 m/min, Minicure, mercury vapour lamp, 80 W/cm, Technigraf).

All figures in % by weight are based on the total weight of the formulation.

| Test | 1 | 2* |
|---|---|---|
| Vesticoat EP 110/IBOA | 48.5 | 48.5 |
| IBOA | 36.8 | 43.5 |
| Hydrolysed Dynasylan Glymo | 6.7 | — |
| IRGACURE 184 | 8 | 8 |
| 240 h salt spray test (scribe creep [cm]) | 2.7 | 8.1 |
| Erichsen cupping [mm] | 9.5 | 10.5 |
| Film thickness [µm] | 28-32 | 31-34 |

*Non-inventive, comparative test

All coatings have sufficient flexibility (Erichsen cupping >5 mm). Only the inventive formulation exhibits sufficient corrosion control (scribe creep <5 cm) after 240 h of salt spray testing (DIN 53167).

The invention claimed is:

1. A method to control corrosion of a metal substrate, the method comprising:
   applying a radiation-curable formulation to the metal substrate to obtain a coated substrate; and
   curing the coating on the substrate;
   wherein
   the radiation-curable formulation comprises:
   a radiation-curable resin; and
   at least 2% by weight of an oligomeric siloxane component which comprises a —Si—O—B— bond, based on the total formulation;
   wherein
   the oligomeric siloxane component is obtained by controlled hydrolysis and condensation of a silane monomer in the presence of boric acid,
   the silane monomer comprises an epoxy-functional silane of formula (I):

$$R^1\text{—}SiR'_m(OR)_{3-m} \quad (I),$$

wherein
   $R^1$ is

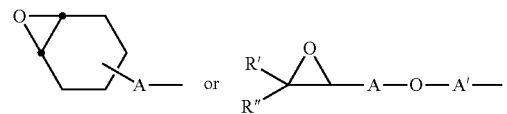

R, R' and R'' are independently, a hydrogen (H) or a linear, branched or cyclic, unsubstituted or substituted alkyl group having 1 to 6 C atoms,
   A and A' are independently, a divalent alkyl group having 1 to 10 C atoms, and
   m is 0 or 1, and
   wherein the radiation-curable resin comprises at least one selected from the group consisting of an epoxy acrylate, a polyester acrylate, a polyether acrylate, a polyacrylate acrylate, and a urethane acrylate.

2. The method to control corrosion of a metal substrate, according to claim 1, wherein the radiation-curable formulation optionally further comprises one or more components selected from the group consisting of
   C) an adhesion promoter,
   D) a radiation-curable reactive diluent,
   E) a photoinitiator,
   F) a pigment
   G) a flow control agent,
   H) a matting agent, and
   I) a degassing agent.

3. The method to control corrosion of a metal substrate according to claim 1, wherein the radiation curable resin comprises a polyesterurethane acrylate.

4. The method to control corrosion of a metal substrate according to claim 1, wherein an amount of the radiation-curable resin is 5% to 95% by weight of the total radiation-curable formulation.

5. The method to control corrosion of a metal substrate according to claim 1, wherein the hydrolysis and condensation of the at least one epoxy-functional silane of formula (I)

$$R^1\text{—}SiR'_m(OR)_{3-m} \quad (I),$$

is controlled to obtain a degree of hydrolysis such that less than 20% by weight of the original weight of epoxy-functional silane of formula (I) remains unhydrolyzed.

6. The method to control corrosion of a metal substrate according to claim 1, wherein, the silane monomer further comprises an organo functional silane, of formula II:

$$R^2\text{—}SiR'_n(OR)_{3-n} \quad (II)$$

wherein
$R^2$ is a linear, branched or cyclic, unsubstituted or substituted alkyl group having 1 to 20 C atoms,
R' is methyl,
R independently are a hydrogen or are a linear, branched or cyclic alkyl group having 1 to 6 C atoms, and
n is 0 or 1.

7. The method to control corrosion of a metal substrate according to claim 1, wherein the weight % of the oligomeric siloxane component is 2-25% by weight.

8. The method to control corrosion of a metal substrate according to claim 1, wherein the silane of formula I is 3-glycidyloxypropyltrimethoxysilane or 3-glycidyloxypropyltriethoxysilane.

9. The method to control corrosion of a metal substrate according to claim 2, wherein the radiation curable formulation comprises from 0.1% to 10% by weight of an adhesion promoter C) wherein the adhesion promoter C) comprises at least one selected from the group consisting of phosphoric acid, a phosphonic acid and a reaction product of phosphoric acid or the phosphonic acid with a functionalized acrylate.

10. The method to control corrosion of a metal substrate according to claim 2, wherein the radiation curable formulation comprises a reactive diluent D), wherein the reactive diluent D) is selected from the group consisting of isobornyl acrylate, hydroxypropyl methacrylate, trimethylolpropane formal monoacrylate, tetrahydrofurfuryl acrylate, phenoxyethyl acrylate, trimethylolpropane triacrylate, dipropylene glycol diacrylate, tripropylene glycol diacrylate, hexanediol diacrylate, pentaerythritol tetraacrylate, lauryl acrylate, propoxylated, ethoxylated, and urethanized reactive diluents thereof.

11. A coated metal substrate obtained by the method to control corrosion of a metal substrate according to claim 1.

12. The method to control corrosion of a metal substrate according to claim 5 further comprising removing a proportion of alcohol formed in the hydrolysis of the silane from the formulation.

13. The coated metal substrate according to claim 11, wherein the radiation curable formulation comprises:

10 to 39 weight % of a difunctional polyesterurethane acrylate;

10 to 70 weight % of isobornyl acrylate;

2 to 25 weight % of an oligomeric siloxane component which is obtained by controlled hydrolysis and condensation in the presence of boric acid of 3-glycidyloxypropyltrimethoxysilane; and 0.2 to 10 weight % of a photoinitiator.

14. The coated metal substrate according to claim 11, wherein the metal comprises steel or aluminum.

15. The coated metal substrate according to claim 11, wherein the coating is at least one selected from the group consisting of a primer, an intercoat and a topcoat.

* * * * *